F. B. Doughty,
Horse Boots.
N° 64,506.      Patented May 7, 1867.
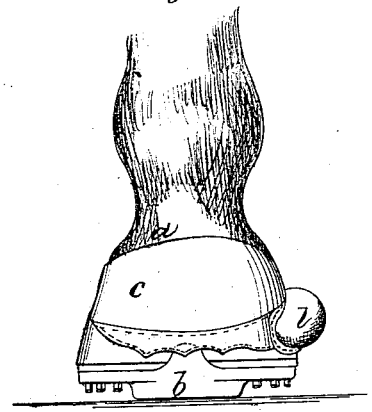
Fig. 1.
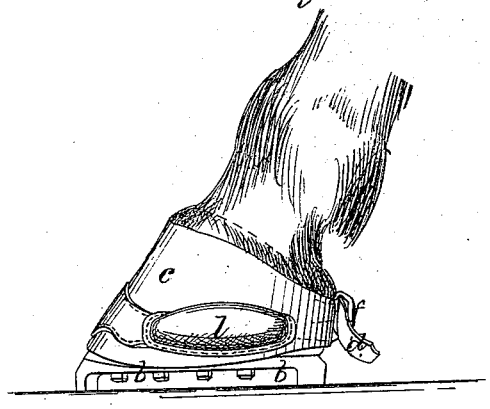
Fig. 2.
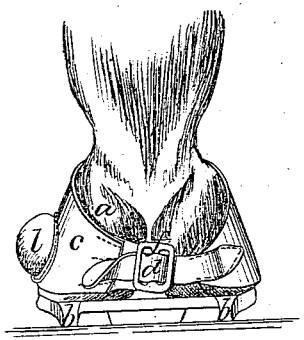
Fig. 3.
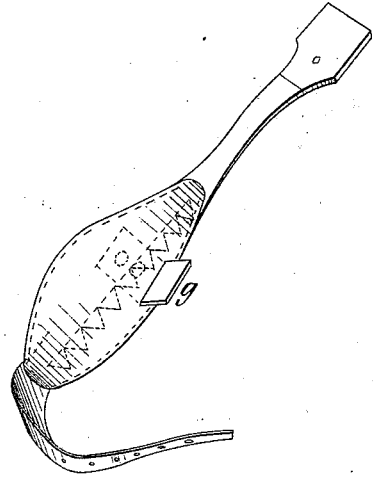
Witnesses;
Wm Trewin
Theo Tusch
Inventor,
F. B. Doughty
Per Munn & Co
Attys

United States Patent Office.

FRANK B. DOUGHTY, OF NEW YORK, N. Y.

*Letters Patent No. 64,506, dated May 7, 1867.*

---

IMPROVED INTERFERING ATTACHMENT.

---

The Schedule referred to in these Letters Patent and making part of the same.

---

TO ALL WHOM IT MAY CONCERN:

Be it known that I, FRANK B. DOUGHTY, in the city, county, and State of New York, have invented a new and "Improved Interfering and Overreaching Attachment for Horses;" and I do hereby declare that the following is a full, clear, and exact description thereof, which will enable others skilled in the art to make and use the same, reference being had to the accompanying drawing, forming part of this specification.

The present invention relates to a novel device to be applied to the hoofs or feet of horses, the purpose of which is to obviate and remedy their interfering and overreaching, the injuries oftentimes resulting therefrom being too well known to require any particular mention herein.

Many attempts have heretofore been made to prevent this "interfering" and "overreaching," but with no really practical or successful results, it being prevented only for and during the time the so-called remedying device was applied, it almost immediately recurring when it was dispensed with or detached, thus, as is obvious, completely failing to obviate the root or direct cause of the trouble. It is not necessary for me to particularly indicate the disadvantages of such a mode or modes of treatment, for although, when employed, it succeeded in obviating the difficulty, it is not very desirable that the horse should be continually subjected to it or for any great length of time, as it does not tend to improve his appearance in the least, and therefore the object of the present invention is to provide such a device and to also so apply it to the proper hoof or foot of a horse subject to interfering or overreaching, or both, that not only will it tend, when applied, to obviate the trouble, but in addition thereto, will, in a short time, have such an effect upon and so change the gait of the horse as to produce a permanent prevention, not requiring its use for any length of time, in order to insure its permanent cure or removal. The manner in which this is accomplished is now to be particularly and in detail described, reference being had to the accompanying plate of drawings, of which—

Figure 1 is a view of the toe portion of a horse's hoof or foot having my interfering and overreaching device applied.

Figure 2 is a side view of the same; and

Figure 3, a view of the heel.

Figure 4 is a perspective view of my improved attachment, showing the spur by which it is secured to the hoof of the horse.

$a$ $a$, in the drawings, represent a horse's hoof or foot, on which is secured, in any suitable manner, a shoe, $b$, made of the usual styles and shape. To and around the hoof, and entirely encasing or surrounding it, is a leather or other suitable band or belt, $c$, securely fastened and held at the heel of the hoof by means of a strap, $d$, and buckle, $f$, as plainly seen in fig. 3, so as to prevent it from slipping or otherwise becoming disarranged but which can be more fully accomplished, if so desired, by roughening or providing the surface of the belt in contact with the hoof with a series of projecting teeth or studs, which will penetrate the hoof sufficiently to prevent any possibility of its slipping. One of these spurs $g$ is shown in fig. 4 and the teeth in red lines of the same figure. The spur is inserted between the shoe and the bottom surface of the hoof, and the pad being strapped upon the latter, is prevented from slipping out of its position. This belt $c$ is provided upon its exterior, and upon that portion thereof which comes upon the inner side of the hoof, with a soft, pliable, and flexible projecting cushion, $l$, of the proper size and shape, that as the horse travels it shall prevent any injury to the other leg of the horse, which would be occasioned, were it not used, by the striking of the hoof against it. In order to prevent overreaching, which, as is well known, causes injury to the fetlocks of the fore legs, this cushion, in lieu of being upon the side of the "overreaching hoof," is upon its toe or front portion, thus entirely preventing the hoof or its shoe from coming in contact with the fetlocks of the fore leg, as is apparent without further explanation. This cushion is not intended to be applied at any particular spot or place of the hoof, but is to be arranged thereon to suit the difficulty which it is to obviate, it being only necessary that the cushion should be in the proper place and upon the hoof of that leg which strikes, and not upon the leg or hoof which is struck, whereby not only is an injury prevented from "interfering" or "overreaching," but its cure perfectly and completely secured in a short time, from the fact that such an application removes the root or cause of the trouble by changing the gait of the horse, as has been demonstrated by practical and successful tests.

I claim as new, and desire to secure by Letters Patent—

Providing the pad with the metallic spur or spurs, as arranged, by means of which, and the straps, the pad is secured to the hoof of the horse, as and for the purpose specified.

The above specification of my invention signed by me this 18th day of July, 1865.

FRANK B. DOUGHTY.

Witnesses:
ALBERT W. BROWN,
M. M. LIVINGSTON.